United States Patent [19]

See et al.

[11] 4,279,021
[45] Jul. 14, 1981

[54] PORTABLE DATA ENTRY APPARATUS INCLUDING PLURAL SELECTABLE FUNCTIONAL CONFIGURATIONS

[75] Inventors: Gary G. See, Chagrin Falls; Robert J. Robbins, Walton Hills, both of Ohio

[73] Assignee: Telxon Corporation, Bath, Ohio

[21] Appl. No.: 12,400

[22] Filed: Feb. 15, 1979

[51] Int. Cl.³ .............................................. G06F 15/06
[52] U.S. Cl. ............................. 364/900; 340/365 VL; 364/709
[58] Field of Search ................ 364/900 MS File, 709; 340/365 VL; 235/145 R

[56] References Cited

U.S. PATENT DOCUMENTS

| | | | |
|---|---|---|---|
| 3,839,708 | 10/1974 | Bredesen et al. | 364/900 |
| 3,946,220 | 3/1976 | Brobeck et al. | 364/200 X |
| 4,092,527 | 5/1978 | Luecke | 340/365 VL X |
| 4,107,784 | 8/1978 | Van Bemmelen | 364/900 |

Primary Examiner—Raulfe B. Zache
Attorney, Agent, or Firm—Yount & Tarolli

[57] ABSTRACT

There is disclosed herein a data entry device designed for general use, and whose functional configuration may be readily changed to meet the specific needs of a number of different customers, each requiring a special assortment of operational features. The device (10) includes a housing (12) having a keyboard (14) including function control and data entry portions (18 and 20). In one embodiment, a plurality of different overlays (22) may be received over the function control portion of the keyboard. Each overlay carries an array of key labels (26), and is pliant enough to permit an underlying key to be actuated by depressing an appropriate key label. Tabs (30, 32, 34) projecting from the frame (24) carrying the overlay actuate switches (132, 134, 136) in the device to identify which overlay is carried by that frame. Other means of identifying the overlays to the data entry device are also shown. A different, permanent set of keys is provided for data entry in this embodiment. In another embodiment, an interchangeable mylar overlay (154) is also provided for the data entry portion of the keyboard. If the device includes a readout or display, the portion of the device (168) carrying legends for the display can also be changed with the overlay.

13 Claims, 13 Drawing Figures

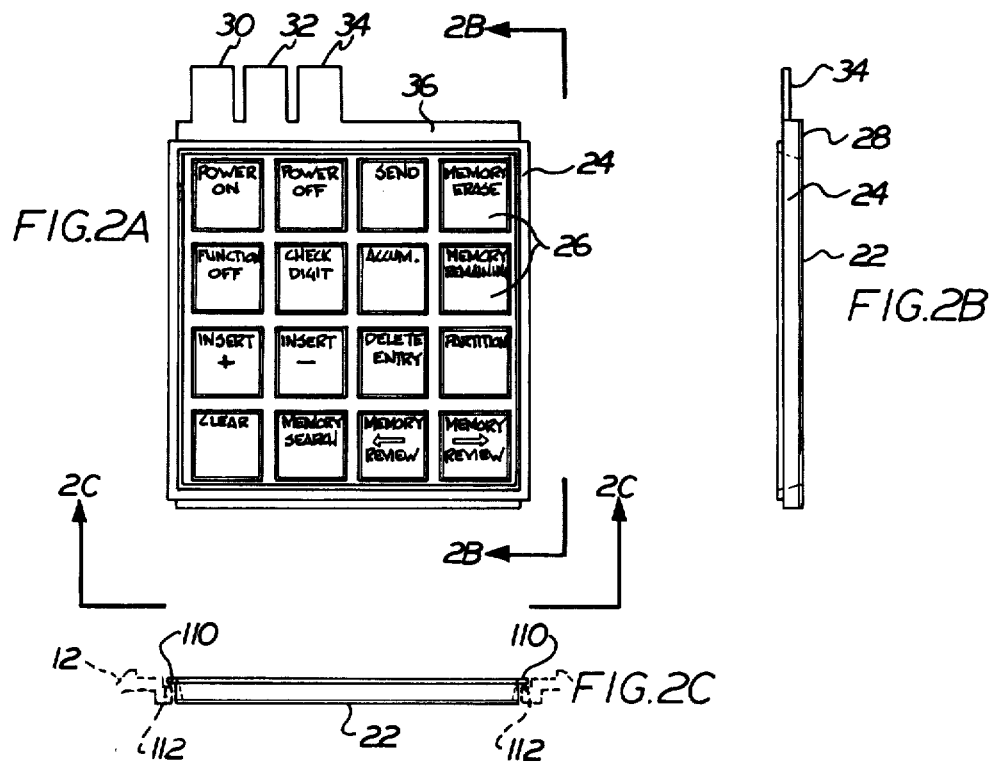
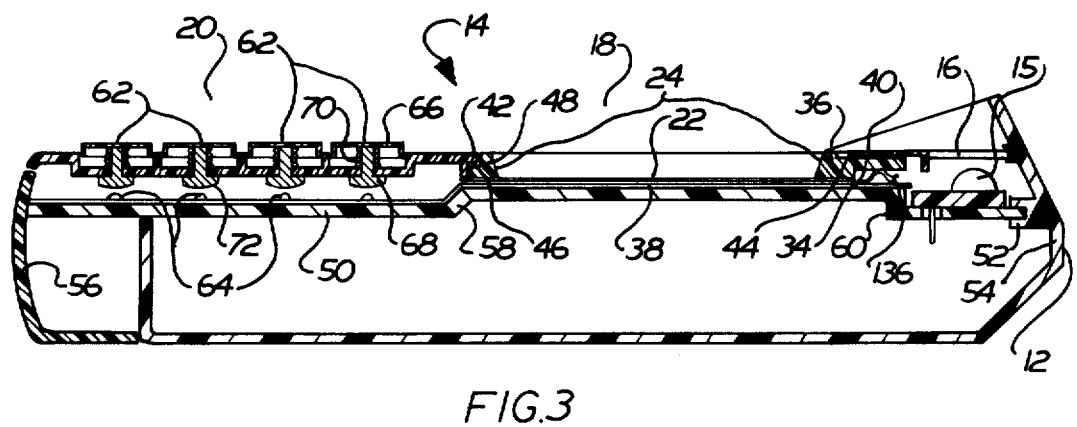

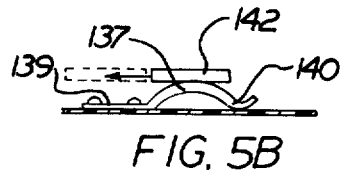
FIG. 4
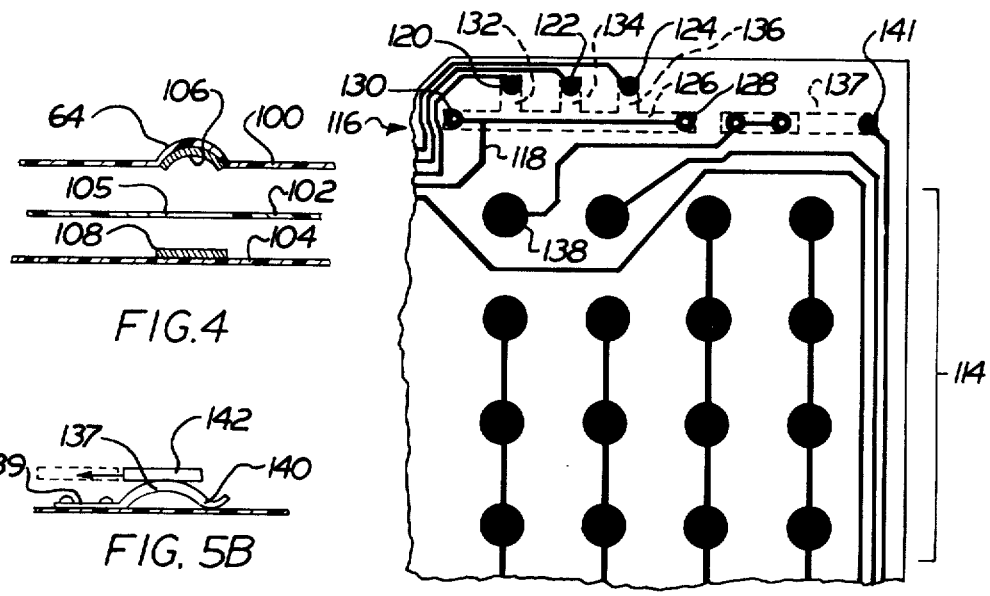
FIG. 5A
FIG. 5B
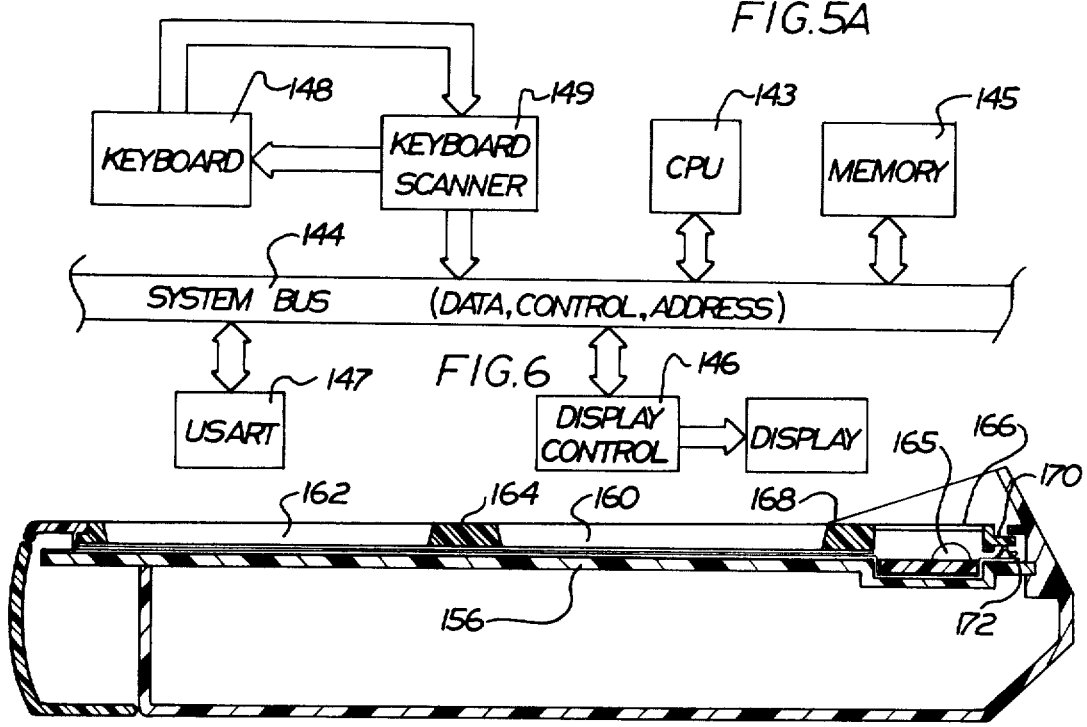
FIG. 6
FIG. 7B

PORTABLE DATA ENTRY APPARATUS INCLUDING PLURAL SELECTABLE FUNCTIONAL CONFIGURATIONS

BACKGROUND AND FIELD OF THE INVENTION

The present invention relates to the art of data entry units and more particularly to a portable data entry unit wherein the functional configuration of the unit may be readily selected in accordance with the needs of a particular end use.

In the daily operation of many businesses, data must be collected at a variety of locations and then transmitted to a central data collection point for tabulation and processing. Utility companies, for example, employ meter readers to collect the readings of utility meters at a large number of customer locations in order to determine the extent of utility usage by each customer in a given billing period. In applications involving other businesses, such as food stores, department stores, and other retail outlets, large amounts of data must be collected for inventory control purposes.

In order to simplify and improve the data collection process in these various businesses, portable electronic data collection devices have been developed and are currently in use. These devices permit an operator to electronically enter data into a bulk data storage (such as a magnetic tape or solid state memory) through a keyboard, scanning "wand", or other input device. The data, once collected, may then be electronically transmitted directly from the bulk data storage to a remote data collection location over ordinary telephone lines, either through the operation of the unit itself or through a peripheral device connected to it.

Although these data collection devices have found great utility in a large number of differing applications, problems have arisen in providing data collection devices which meet the varying needs of the diverse businesses which employ them. Thus, in each particular application it will be desirable to provide certain functions which, if not unique to that application, are at least common to only a relatively minor portion of the total market. Although it is possible to provide individual models which are uniquely designed for use in a particular application, these specially designed units will generally be more costly than similar, general purpose units enjoying a wider market. The individual users must therefore either settle for a general purpose unit which does not entirely meet his needs, or must bear the additional cost necessitated in the design of a unit specially prepared for that business. Clearly, neither alternative is very attractive.

SUMMARY OF THE INVENTION

There is disclosed herein a data entry device which is designed for general purpose use, and whose functional configuration may be readily tailored to meet the specific needs of customers requiring special, operational features. The device accomplishes this by utilizing a keyboard having different interchangeable overlays. Each of these overlays carries a number of key identifiers designating different functions, with the functions included on each overlay being selected in accordance with the needs of a specific customer or group of customers. This overlay is constructed of a sheet of flexible material which is pliant enough to permit the keys under the overlay to be actuated simply by depressing the appropriately labelled portion of the overlay. Each overlay has an associated overlay identifier means which is interconnectable with the data entry device for identifying the particular overlay included therewith to the electronics carried within the device; the device will then automatically perform the appropriate functions upon actuation of the respective function keys.

In one embodiment, the overlay covers only the function control portion of the keyboard, with a separate keypad being provided for data entry, including a different tactile feel selected to facilitate data entry. In another embodiment, an overlay for the entire keyboard of the unit is replaceable so as to permit programming of all of the keys carried thereon. In this embodiment, the display window through which a display device is viewed is also replaceable with the overlay, so that any legends associated with the display window to identify the various portions of the display may be changed along with the overlay.

The programming of the unit in accordance with the various overlays is accomplished in one embodiment by providing tabs which project from a frame holding the overlays, and by selecting the number and position of these tabs in accordance with the particular overlay included therewith. These tabs actuate switches carried in corresponding positions on the data entry device so as to provide electrical signals to identify the particular overlay to the electronics carried within the unit. Other means of automatically identifying the particular overlays to the device are also disclosed. In one, a solid state memory device is carried on the frame holding the overlays, with the memory storing programs for causing the data entry device to perform the functions which are called by the actuation of the various function keys.

The underlying data entry unit is usable with all overlays, and thus a single standard data entry device may be employed for all applications. This permits the data entry device to be manufactured at optimum cost. Furthermore, the unit may then be tailored to specific end uses simply by inserting the overlay carrying the particular functions required for that end use. The key identifiers carried on the overlays may also be color coded in accordance with the nature of the functions provided by the various keys, and may carry foreign language key identifiers thereon. The net result is a unit which may be used in a wide variety of end uses, and which is much lower in cost than a comparable unit, designed solely for a selected end use.

Although particularly useful in portable, handheld data entry units, it will be appreciated that the invention has a broader application to data entry units, in general.

BRIEF DESCRIPTION OF THE DRAWINGS

The foregoing and other aspects and advantages of the present invention will become more readily apparent from the following detailed description, as taken in conjunction with the accompanying drawings, wherein:

FIGS. 2A, 2B and 2C are various view of one of the interchangeable keyboard overlays used in conjunction with the unit illustrated in FIG. 1;

FIG. 3 is a sectional view of the data entry device illustrated generally in FIG. 1;

FIG. 4 is an expanded sectional illustration of a portion of the keyboard utilized in conjunction with the portable data entry device of FIG. 1;

FIGS. 5A and 5B are views of the portion of the keyboard carrying the switches actuable by the various overlays;

FIG. 6 is a broad block diagram of the electronics housed within the portable data entry device;

FIGS. 7A and 7B are illustrations of a second embodiment of a portable data entry device in accordance with the teachings of the present invention, wherein essentially the entire face plate of the data entry device is replaceable, including both function and data entry overlay portions as well as the window overlaying the display thereof;

DETAILED DESCRIPTION

Figure 1:
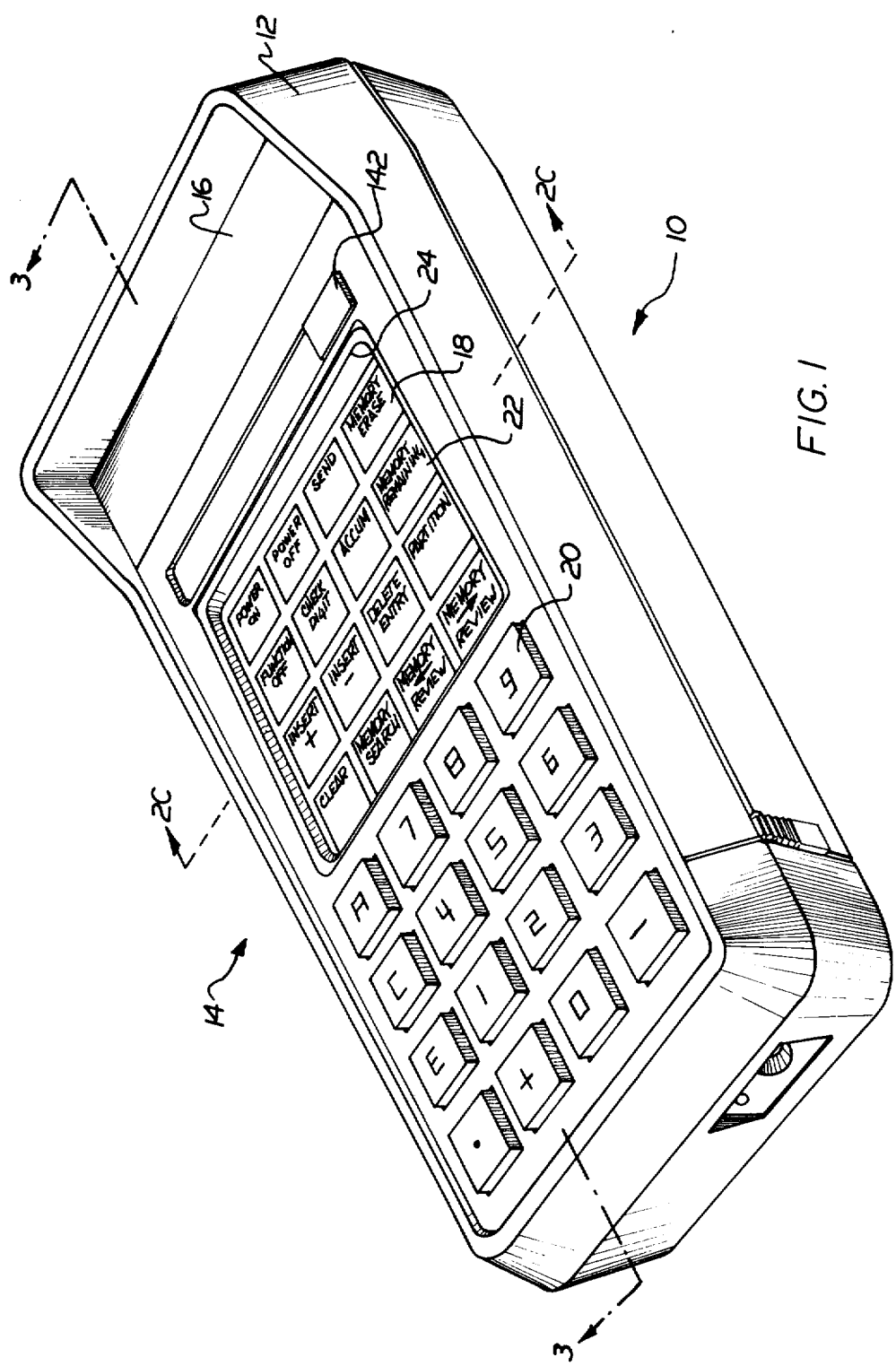
FIG. 1 is a perspective drawing of one embodiment of a portable data entry device in accordance with the teachings of the present invention.

FIG. 1 illustrates one embodiment of a portable data entry device in accordance with the teachings of the present invention. As shown in FIG. 1, this portable data entry device, generally indicated at 10, includes a molded plastic housing 12 within which will be mounted the printed circuit boards carrying the electronic components required for the storing and manipulation of data entered therein. A keyboard, generally indicated at 14, is provided on one face of the molded plastic housing 12 to permit the operator to enter data into the device, and to manipulate the data thus stored within the device. The portable data entry unit also includes a conventional read-out device 15 (FIG. 2) for displaying data and alphanumeric messages to the operator. Read-out device 15, which is not visible in FIG. 1, is mounted behind a transparent display window 16.

In the embodiment illustrated in FIG. 1, the keyboard 14 is divided into two separate sections: a function control keyboard 18, and a data entry keyboard 20. The function control keyboard 18 includes an array of keys for controlling such functions as the application of power to the unit, memory search and review functions, data insert and deletion functions, etc. The data entry keyboard 20, on the other hand, includes a second array of keys which are used for the actual entry of data into the device. Each of these keys represents a corresponding alphanumeric character which is to be stored within memory.

In this embodiment, the data entry portion 20 of the keyboard 14 is of general application, and forms a permanent part of each unit. The set of characters which may be entered into the memory is thus fixed in this embodiment. The set of functions performable by the unit, on the other hand, will vary from unit to unit, depending upon the particular application in which that unit is employed. Thus, to permit the functional configuration of the unit to be tailored to a specific end use, these function control keys are not assigned any fixed control function. The functions controlled by these keys instead vary from application to application. Furthermore, the key identifiers which identify the operation controlled by the various keys of the function keyboard 18 are carried on a thin, flexible overlay which completely covers the actual keyboard. This overlay (which may, for example, be formed from a single thin mylar sheet) has enough pliance to permit the various underlying keys to be actuated by simply depressing the appropriate portion of the overlay. As will be made clear hereinafter, the key identifiers or labels carried on the overlay will each be aligned in registration with a respective associated key on the function control keyboard. The operation may thus select a particular function by simply depressing that portion of the mylar overlay carrying the label identifying the selected function.

This overlay 22 is attached at its perimeter to a rigid frame 24 which may be of molded plastic construction. This rigid frame, together with the mylar overlay attached to it, may be removed from the unit and another substituted in its place. Thus, overlays carrying different function labels may be substituted for one another in each of the units 10.

As will be brought out in greater detail hereinafter, each of the overlays which may be inserted into the unit includes means for indicating to the data entry device the nature and arrangement of function labels carried on that overlay. The data entry device automatically assigns the respective keys to the appropriate function in accordance with these indications. The data entry device is thus programmed or adapted to perform the functions identified by that overlay. In this fashion, the unit may be tailored to a particular end use by simply inserting therein an overlay which includes the functions required for that particular end use.

FIGS. 2A–2C are more detailed illustrations of the mylar overlay 22 and its associated frame 24. The molded plastic frame 24 which carries the mylar overlay 22 is essentially square, having a square opening in the center thereof. The dimensions of the mylar overlay are selected to be similar to the outside dimensions of the frame 24 so that the mylar overlay 22 may be affixed to the frame 24 at the perimeter 28 thereof, as by gluing or in any other convenient fashion.

As can be seen in these figures, the mylar overlay is in this case a generally square mylar sheet having a regular array of 16 squares printed thereon, with each of these squares carrying an associated key label or designator. When the overlay is inserted into the data entry unit, each of these squares will be aligned over a corresponding switch of the function keyboard so that the depressing of any of the 16 squares will result in the actuation of a corresponding key of the function keyboard.

Preferably, but not necessarily, the 16 squares will be color coded according to their functional group. Thus, for example, all those squares containing labels relating to memory search or review may be blue, those relating to power control may be white, etc.

Each of the mylar overlays provides coded indications to the portable data entry device as to which function labels are carried thereon, so that the data entry device will perform the control function upon the actuation of any of the function keys. In the embodiment illustrated in FIG. 2, these coded indications are provided by tabs associated with the frame 24. As can be seen in FIG. 2A, the frame 24 has three tabs 30, 32 and 34 which are molded as an integral part of the frame 24. These tabs project outward along the plane of the mylar sheet 22 from a portion 36 of the frame 24. One or more of these pins may be broken off at the portion 36, so as to provide eight different possible tab configurations. In practice, the particular configuration (i.e., the number and position of the tabs) will be selected to uniquely identify the particular mylar overlay 22 attached to that frame 24. As will be brought in greater detail hereinafter, the portable data entry unit includes means for sensing the number and position of these tabs, and for thus determining which of the overlays is included on the particular frame attached to the unit.

Of course, if more than eight different overlays are available for substitution into the unit, then the number of tabs will be increased to permit each overlay to have a unique tab arrangement. If four tabs are provided, for example, sixteen different overlays can be identified, whereas if five tabs are provided, then thirty-two different overlays can be uniquely identified.

The manner in which these frames and their accompanying overlays are inserted into and removed from the unit may be more readily understood through reference to FIG. 3. In this figure, which is a sectional view taken along lines 3—3 of FIG. 1, it will be seen that the keyboard, identified by reference numeral 38, has a very thin cross section. This keyboard will preferably have a conventional laminated mylar construction described hereinafter with reference to FIG. 4. When a particular frame member 24 is inserted into the data entry device, its accompanying mylar overlay will essentially rest in contact with the upper surface of the keyboard 38. The frame 24 of the overlay will then be held between this keyboard 38 and several lips 40 and 42 on the housing 12. These lips 40 and 42 extend outward over corresponding steps 44 and 46 in the frame member 24. The frame member 24 will be resiliently biased leftward (as viewed in FIG. 3) against the lip 42 by a spring (not shown) acting between the frame member 12 and the portion 36 of the frame 24.

In order to remove the frame 24, and thus the mylar overlay 22 from the data entry device, the frame 24 must be manually forced rightward (as viewed in FIG. 3) against the spring bias so that the step 46 in the frame member 24 is released from the lip 42 projecting out from the housing 12. This permits the portion 48 of frame member 24 to be lifted above the level of the lip 46, allowing the frame 24 to be withdrawn leftwardly, again as viewed in FIG. 3.

As can be seen in this figure, the laminated mylar keyboard 38 also extends below a number of push buttons 62 associated with the data entry keyboard 20. Keyboard 38 includes an array of switches actuable by these push buttons 62. The mylar keyboard is supported on and attached to a molded plastic substrate 50 which extends from a slot 52 carried by the front wall 54 of the housing 12 to the rearwall 56 of the housing. This substrate 50 has two steps 58 and 60 therein so that the level of the substrate is raised in the vicinity of the function key pad 18. The portions of the plastic substrate underlying push buttons 62 and the display window 16 are set off from the surface of the data entry device so as to allow for the greater depth of the push buttons and display which must be housed in these areas.

Each of push buttons 62 is of a two-piece construction, including a key pad 66 and associated plunger 68. The push buttons are each spring loaded toward an outwardly extending position by an associated spring 70 carried on the plunger 68 and acting between the associated key pad 66 and the housing 12.

Dimples 64 are formed in the upper laminate of the mylar keyboard 38 in order to provide a tactile feel to the data entry keyboard 20. When one of the buttons 62 is depressed, the rounded bottom portion 72 thereof will contact the corresponding dimple 64, causing it to collapse suddenly and make electrical contact with a second mylar laminate carried underneath it. The sudden collapse of the dimple 64 provides a positive tactile feel verifying that key actuation as taken place to the operator.

The nature and operation of the mylar laminate keyboard 38 (FIG. 3) may be better understood through reference to FIG. 4, which is a sectional view of one of the many switches carried thereon. The keyboard 38 is comprised of a laminate of three sheets of thin mylar plastic 100, 102, and 104. The bottom surface of the mylar sheet 100 and the upper surface of mylar sheet 104 carry the electrical contacts 106 and 108 which together form the switch. Conventional printing techniques are used to deposit the switch contacts on the mylar sheets. Separating the two layers 100 and 104 is a third layer 102 provided to prevent electrical contact between any leads carried on mylar sheets 100 and 104, except at the positions thereon corresponding to the positions of the contacts such as contacts 106 and 108. The mylar sheet 104 will have openings 105 aligned with the contacts of the various switches to permit the two contacts to meet when the top sheet 100 is depressed by the operator. In FIG. 4, of course, the thickness of the contacts 106 and 108 deposited on the mylar sheets 100 and 104 is grossly exaggerated for purposes of clarity. Furthermore, in the actual keyboard, the three layers of mylar 100, 102 and 104 will rest directly atop one another, rather than being separated from one another in a fashion illustrated in FIG. 4. In the portion of the keyboard underlying the push buttons 62, the upper laminate 100 will be deformed into a dome shape at each switch contact 106, thus producing the dimples 64 as shown. The switches on the keyboard 38 under the overlay 22 are constructed as shown in FIG. 4, except that the upper sheet is preferably not dimpled.

When an operator depresses the top portion of the mylar sheet 100, this mylar sheet will be deflected downward until contact 106 meets contact 108. A complete circuit will then be formed through the contacts, representing actuation of the switch. If desired, the sheet 102 may be replaced by a sheet of resilient material of somewhat greater thickness, so that a greater amount of pressure is required to actuate the switch.

As stated previously, the function keyboard 18 will be covered with a flexible sheet of material bearing labels identifying the functions of the respectively associated key. This mylar overlay, which will rest directly atop the upper layer 100 of the keyboard, will have sufficient pliance that the respective keys of the function keyboard may be actuated by simply depressing the appropriately labeled portion of the mylar overlay.

Registration between the respective legends carried on the mylar overlay and the underlying switches is, of course, of great importance since the operator must identify the position of a particular switch by locating the appropriate label on the mylar overlay. To assure that the proper registration exists, the mylar overlay is attached to the frame 24 in an alignment selected so that, when frame member 24 is installed in the data entry device, the labels thereon will be in proper registration with the underlying switches.

Registration of the frame in one dimension on the data entry devide is established by abutment between the lip 42 and the step in the portion 48 of the frame. As stated previously, the frame is spring biased into this abutting relationship. Registration of the frame in the transverse dimension on the data entry device, on the other hand, is maintained by small lips 110 (FIG. 2C)

integrally formed on outside transverse edges of the frame 24. These lips will ride upon corresponding rails 112 (shown in dotted lines in FIG. 2C) formed in the housing 12 adjacent the position within which the frame is to be inserted. The spacing between the two rails is selected to closely match the corresponding transverse dimension of the frame 24 so that the frame 24 will be held in the proper transverse orientation upon insertion into the data entry device.

FIG. 5A illustrates in greater detail the manner in which the programming tabs 30, 32 and 34 (FIG. 2) actuate switches within the data entry device so as to indicate to the device which of the possible function overlays is carried by that particular frame. In this figure, which is a top view of the bottom layer 104 of the mylar keyboard, darkened areas represent those areas in which a conductive layer of ink has been deposited upon the surface of the mylar so as to form the contacts and various interconnecting leads. For convienence of description, the middle and upper layers 100 and 102 are not shown in this drawing. The sixteen darkened circles 114 shown in the lower portion of FIG. 5A are the bottom contacts of the sixteen switches used to control the operation of the various functions performed both by the data entry device.

The portion of the drawing identified by reference numeral 116 is that portion carrying the switches actuable by the various programming tabs 30, 32 and 34 to identify the particular mylar overlay connected to the unit at any given time. Both middle and upper layers of the keyboard will have openings in them above the various contacts in the area 116 of the keyboard. The various switches operate to selectively connect a keyboard scan line 118 to three contacts 120, 122 and 124. A metal strap 126 indicated in dotted lines in FIg. 5A is interconnected between two contacts 128 and 130 representing part of the scan line 118. The metal strap is held against these contacts by two metal rivets protruding through the plastic substrate through the center of the contacts 128 and 130, and through corresponding holes at either end of the metal strap 126. The metal rivets hold the metal strap 126 in close electrical contact with the contacts 128 and 130 of the scan line 118. Three spring metal fingers 132, 134 and 136 extend from the metal strap 126 over the surface of the respective contacts 120, 122 and 124, and normally ride somewhat above the corresponding contact. Each of these metal fingers has a generally S-shape, as can be seen more clearly in FIG. 3.

When one of the three programming tabs 30, 32 and 34 is present on the frame 24, the insertion of that frame into the data entry device will cause the tabs thereof to force the corresponding metal finger 132, 134 or 136 into contact with its associated contact, 120, 122, or 124. If that tab has been broken off, however, the switch will remain open. The particular code carried on a given frame 24 is thus translated into switch closures and can be identified by the device by applying a voltage to scan line 118, and sensing at contacts 120, 122 and 124 whether that voltage has been transmitted thereto through the respective finger contacts.

As stated previously, the switches associated with the function keyboard are not generally assigned a fixed use, since the use of the various switches will depend upon the particular overlay in use at a given time. Two of these switches, however, do have fixed uses. The POWER ON and POWER OFF switches are dedicated to the control of power-up and power-down of various elements of the control circuitry. Unfortunately, this means that the unit may be accidentally powered-up during shipping, storage, etc. This may result in accidental depletion of the internal batteries, and loss of whatever data is stored in memory. To prevent this, the illustrated unit includes a LOCK switch 137 (FIG. 5B) in series with the POWER ON switch 138. The LOCK switch 137 includes a metal strap 139 which is riveted to contacts connected to the POWER ON switch 138. A spring finger 140 associated with the strap 139 normally rides over a contact 141 connected to the power on circuitry, and may be forced onto this contact by a slide plate 142 which is accessible to the operator through the housing, and is carried in rails (not shown) on the housing 12. When the plate 142 is in the position shown, the POWER ON switch 138 is connected to the power on circuitry through the spring finger 140. When the operator slides the switch to the position indicated in dotted lines in FIG. 5B, however, the spring finger 143 will disengage from the contact 141, effectively disabling the POWER ON switch 138.

FIG. 6 is a general block diagram of the electronics carried in the housing 12 which performs the various data storage and manipulation functions required of the unit. In the data entry unit schematically illustrated in this figure, a microprocessor 143 is provided for performing all necessary functions required of the unit. This microprocessor 143 is interconnected with the various other electronic components contained in the device via a system bus 144 which contains data, control, and address lines in a conventional manner. Also connected to the system bus is a solid state memory 145, including both ROM (read only memory) carrying program instructions and a large amount of RAM (random access memory) for storage of the data collected by the unit. Conventional display control circuitry 146 and serial input/output circuitry 147 (such as a USART) are also connected to the microprocessor through the system bus.

The function and data entry keyboards are schematically represented in FIG. 6 by the block identified by reference numeral 148. To enter data into the system from the keyboard 148, a conventional keyboard scanner 149 is provided. This keyboard scanner will scan the keyboard in a conventional manner to determine if any of the keys thereof have been closed. Although illustrated as separate from the display control, it will in many cases be convenient and desirable to consolidate the keyboard scanner with the display control in a single circuit.

As stated previously, one of the keyboard scan lines (identified by reference numeral 118 of FIG. 5) is associated with the switches actuable by the programming tabs of the overlay frame as to identify the particular overlay being carried thereon. Preferably, the keyboard scanner 149 will be completely controlled by the microprocessor 143, so that the scanning proceeds as controlled by the microprocessor. When the microprocessor 143 determines that a function key has been depressed, the microprocessor will refer to the switches associated with the programming tabs to determine which of the overlays is presently being used with the unit. Based upon the location of the key depressed and the coded indications being provided by the programming switches, the microprocessor will perform the appropriately designated function.

When the unit is initially turned on, the microprocessor will scan the programming tabs to determine which overlay is in place on the unit. The microprocessor will then cause the display to provide a visual indication identifying the overlay then in use. When an alphanumeric display is being used, this visual indication will take the form of an actual word (such as "Bookkeeper" or "Inventory") describing the nature of the attached overlay.

The circuitry shown in FIG. 6 will be powered by a portable power source, such as a battery pack, either integral with the unit or connectable thereto. As stated previously, a power control circuit (not shown) will be provided to power down the unit when not in use.

Figure 7A:
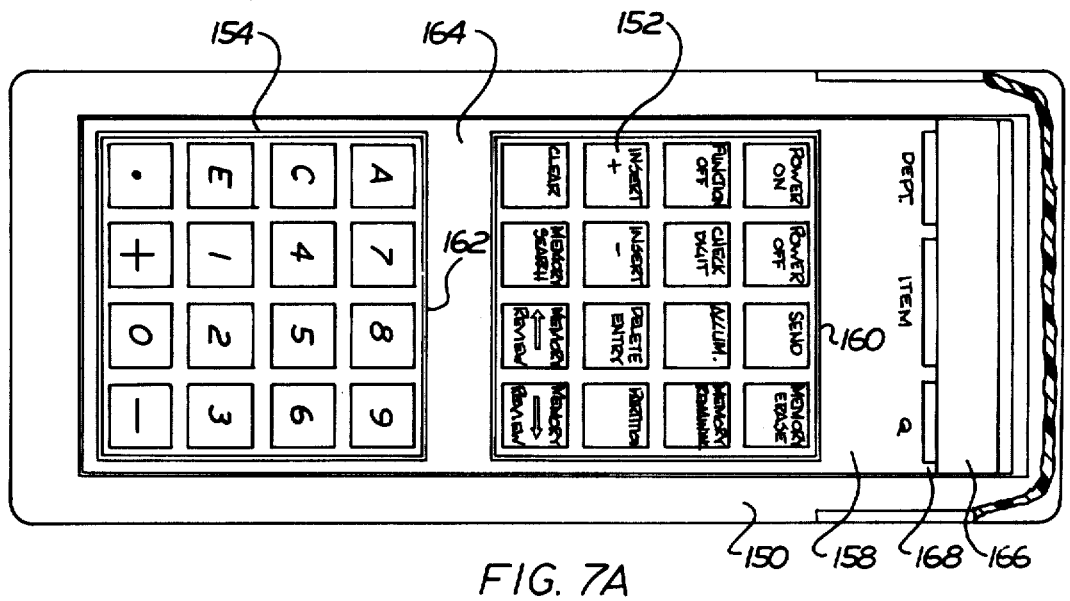

Referring now to FIGS. 7A and 7B, a second embodiment of the present invention is illustrated. As in the previous embodiment, the data entry unit 150 includes a function control keyboard 152, and a data entry keyboard 154. In this embodiment, however, the data entry keyboard does not include push buttons, being rather covered by an overlay similar to that covering the function keyboard. This overlay bears character designations identifying the particular characters which will be entered when that portion of the keyboard is depressed. The overlays for both function and data entry keyboards are carried in a single frame 158. In fact, both overlays are formed on a single sheet of mylar. This single sheet of mylar material is bonded to the bottom of the frame 158 so that an array of function control labels is in registration with a substantially square opening 160 in the frame 158. Similarly, the portion of the mylar overlay carrying the character designators will then be in registration with a second substantially square opening 162 in the frame 158. The cross member 164 separating the two openings 160 and 162 lends structural strength to that portion of the frame 158.

In the embodiments shown in FIGS. 7A and 7B, the frame 158 which carries the overlays for the function and data entry keyboard, also covers the cavity containing the readout device 165, and carries thereon the transparent plastic window 166 through which this readout or display device is viewed. The frame 158 also carries a legend carrying portion 168 bearing legends identifying the various portions of the display as corresponding to various items of data entered into or supplied by the device. Since the window is replaceable with the frame member 158, the legends may also be changed in accordance with a particular use required with the unit. In FIG. 7A, these legends are shown as being imprinted on the portion of the frame 158 immediately below the display window 166. It will be appreciated, however, that this information could also be carried on the window 166, itself.

As can best be seen in FIG. 7B, the frame member carrying the overlays and the window will, as in the previous embodiment, still carry programming tabs 170 which will actuate spring contacts 172 attached to the portion of the keyboard underlying the programming tabs.

In FIG. 7B it is also seen that the leads of the display device 165 do not, in this embodiment, extend through the plastic substrate 156. Instead, contacts are provided on the underside of the display device 165 in registration with corresponding contacts on the mylar keyboard which, in this case, passes immediately under the display device. When the display device 165 is fastened (as by screws, hot staking, etc.) on top of the mylar sheet carrying the contacts, then, the display device 165 will meet, and thus be connected to the leads formed on the mylar keyboard. A single connector joining leads on the mylar keyboard to the electronic circuitry carried within the housing can thus be used for both the actual keyboard switches and the display device 165.

Figure 8:
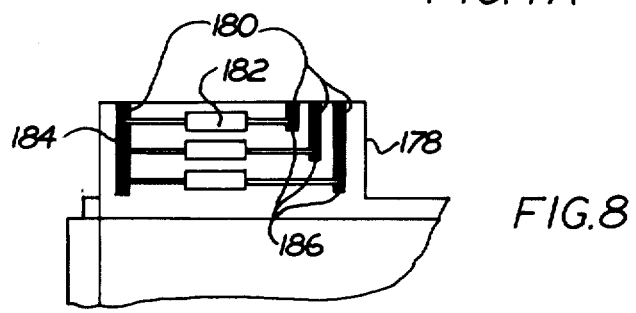
FIG. 8 illustrates a second approach which can be used for identifying the particular overlay to the portable data entry device.
Figure 9:
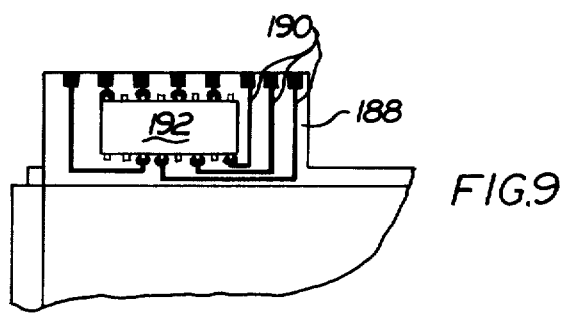
FIG. 9 illustrates a third approach which can be used to identify the particular overlay to the data entry device.

FIGS. 8 and 9 illustrate alternative manners in which coded indications can be provided to the electonic circuitry of the data entry device to indicate which of the many possible function overlays is included therewith. In FIG. 8, a single projecting tab 178 is provided in place of the three programming tabs, 30, 32 and 34 of the FIG. 2 embodiment. This projecting tab has four electrical leads 180 deposited thereon, between which may be connected electrical components 182, such as diodes. The data entry device will then include an edge connector of any conventional construction having contacts adapted to contacts the leads 180 on the tab 178. In this embodiment, a scanning voltage will be applied through the edge connector to the leftward lead 184 of the tab 178. The voltage appearing on the three rightward leads 186 will then be sensed by appropriate circuitry to determine the particular combination of electrical components 182 joining the lead 184 to the contacts 186. Thus, any one of the components 182, of all of them, may be present in any given frame member. Eight different combinations of components are therefore possible, permitting unique identification of eight different arrangements of key identifiers on the overlays. In another embodiment, the components 182 could be replaced by jumper wires. The inclusion of diode 182 will, however, be useful when it is desired to isolate each of the leads 186 from a voltage applied to one of the other leads 186, in the absence of a voltage being applied to lead 184.

In the FIG. 9 embodiment, the three programming tabs 30, 32 and 34 are again replaced by a single projecting tab 188, and again a plurality of electrical leads 190 are formed on the tab 188. In this case, however, the electrical component connected to the tab 188 is an integrated 192 circuit such as, for example, a programmable read only memory (PROM) containing programs identifying the operations which must be performed by the unit upon depressing of the appropriate key identifiers on the mylar overlay associated with that frame member. Of course, in a given embodiment two or more PROM circuits could be provided, rather than the one illustrated in FIG. 9. The use of this method reduces the requirements for extraneous programming in the data entry device, since in this case the entire programming required to perform a particular function may be carried in the integrated circuit 192. Again, an edge connector of any conventional construction will be provided in the data entry device, so that the insertion of the frame into the device will automatically connect the leads 190 to corresponding contacts in the edge connector. In this embodiment, however, the connections will be directly made to the appropriate portions of the system bus, shown in FIG. 6, rather than to the keyboard scanner 148.

Of course, many other possible manners of programming the unit from the frame associated with the mylar overlay may be utilized. Thus, for example, in the FIG. 8 embodiment a large number of leads 186 could be provided for selective interconnection with the lead 184, so as to also provide an increase in the number of mylar overlays which may be uniquely identified by the code indication, represented by the interconnection between the leads 184 and 186. Moreover, any of these programming arrangements may be used in any of the embodiments of the data entry device heretofore described.

Although it is preferably preferred that the tabs, electrical components, or other programming means be formed as or on an integral part of the frame carrying the particular mylar overlay, it should be recognized that this programming means may instead be formed as a separate element, interconnectable to the data entry device separate and apart from the associated mylay overlay. In this event, the particular programming means employed could be interconnectable with the data entry device from the top, bottom, sides, etc.

Therefore, although the invention has been described with respect to a preferred embodiment, it will be appreciated that a large number of alterations and variations of parts may be made without departing from the spirit and scope of the present invention, as defined in the appended claims.

What is claimed is:

1. Apparatus comprising
   a portable hand-held data entry device including a keyboard having an array of keys thereon, said keys being actuable by manual depression for data entry or data manipulation, wherein the operations performed by said data entry device upon actuation of said keys is established by coded indications provided to said device by coding means interconnectable therewith,
   coding means removably interconnectable with said portable data entry device, said coding means providing coded indications thereto to select the functions to be performed by said portable data entry device upon actuation of said keys, and
   key identification means associated with said coding means and comprising a sheet of material adapted to be removably laid over said array of keys, said sheet having sufficient pliance that said keys may each be actuated by depressing the corresponding portion of said sheet, and having an array of key identifiers carried thereon in an arrangement corresponding to the arrangement of said keys on said keyboard, a frame member for carrying said pliant sheet of material, said frame member being substantially rigid and adapted to hold said pliant sheet by the perimeter thereof so as to hold said sheet of material, and thus said key identifiers, in a predetermined alignment with respect to said frame member, and
   wherein said portable data entry device includes means for receiving and holding said frame member in a predetermined alignment with respect to said keyboard, said predetermined alignments between said keyboard and said frame member and said sheet material being selected so that proper alignment between said keyboard and said key identification means will necessarily result when said frame member is received and held by said portable data entry device,
   whereby each of said key identifiers will be positioned over a corresponding key when said keyboard and key identification means are properly aligned with respect to one another, and with each of said key identifiers identifying the function of said corresponding key when said associated coding means is interconnected with said device, and whereby the operator controllable functions performed by said device may be tailored to specific end uses of the device by interconnecting an appropriate coding means and associated key identification means therewith.

2. Apparatus as set forth in claim 1 wherein said array of keys comprises an array of keys which require little travel for actuation so that the pliance required of said sheet in order that said keys may each be actuated by depressing the corresponding portion of said sheet, is minimized.

3. Apparatus comprising
   a portable hand-held data entry device including a keyboard having an array of keys thereon, said keys being actuable by manual depression for data entry or data manipulation, wherein the operations performed by said data entry device upon actuation of said keys is established by coded indications provided to said device by coding means interconnectable therewith,
   coding means removably interconnectable with said portable data entry device, said coding means providing coded indications thereto to select the functions to be performed by said portable data entry device upon actuation of said keys, and
   key identification means associated with said coding means and comprising a sheet of material adapted to be removably laid over said array of keys, said sheet having sufficient pliance that said keys may each be actuated by depressing the corresponding portion of said sheet, and having an array of key identifiers carried thereon in an arrangement corresponding to the arrangement of said keys on said keyboard, whereby each of said key identifiers will be positioned over a corresponding key when said keyboard and key identification means are properly aligned with respect to one another, and with each of said key identifiers identifying the function of said corresponding key when said associated coding means is interconnected with said device,
   whereby the operator controllable functions performed by said device may be tailored to specific end uses of the device by interconnecting an appropriate coding means and associated key identification means therewith,
   wherein said keyboard has a laminated structure including a substantially planar upper layer of pliant material having an array of first electrical contacts formed on the bottom surface thereof, a substantially planer lower layer of material having an array of second electrical contacts formed on the top surface thereof in registration with said first contacts, each associated first and second contact representing one of said keys, and a substantially planar middle layer of insulating material having an array of openings therein in registration with said first and second electrical contacts, whereby said keys may each be actuated by depressing the portion of said upper layer carrying one of said first contacts to cause it to deflect downward and meet the associated one of said second contacts, whereby said keyboard is substantially planer and includes an array of keys requiring little travel for actuation, said sheet of material also being planer and adapted to be laid substantially in contact with said upper layer of said keyboard, said sheet thus also requiring little travel for actuation of said keys.

4. Apparatus as set forth in claim 3, wherein said key identification means further comprises a frame member for carrying said pliant sheet of material, said frame member being substantially rigid and adapted to hold said pliant sheet by the perimeter thereof so as to hold said sheet of material, and thus said key identifiers, in a predetermined alignment with respect to said frame member, and wherein said portable data entry device includes means for receiving and holding said frame member in a predetermined alignment with respect to said keyboard, said predetermined alignments between said keyboard and said frame member and said sheet material being selected so that said proper alignment between said keyboard and said key identification means will necessarily result when said frame member is received and held by said portable data entry device.

5. Apparatus as set forth in claim 4, wherein said frame member includes projections at selected places therealong, with the number and positions of said projections being selected in accordance with the particular key identifiers carried on said pliant sheet material, whereby the number and location of said projections represent said coded indications, and further wherein said portable data entry device includes means for sensing the number and position of said projections and for establishing the functions performed by said device upon actuation of the keys of said keyboard in accordance with the sensed said number and location of said projections.

6. Apparatus as set forth in claim 5, wherein said means for sensing the number and position of said projections includes a plurality of switch means formed on said laminated structure of said keyboard, each of said switch means being formed at one of plural discrete positions which said projections may occupy when said frame is received and held on said keyboard.

7. Apparatus comprising
   a portable hand-held data entry device including a keyboard having an array of keys thereon, said keys being actuable by manual depression for data entry or data manipulation, wherein the operations performed by said data entry device upon actuation of said keys is established by coded indications provided to said device by coding means interconnectable therewith,
   coding means removably interconnectable with said portable data entry device, said coding means providing coded indications thereto to select the functions to be performed by said portable data entry device upon actuation of said keys, and
   key identification means associated with said coding means and comprising a sheet of material adapted to be removably laid over said array of keys, said sheet having sufficient pliance that said keys may each be actuated by depressing the corresponding portion of said sheet, and having an array of key identifiers carried thereon in an arrangement corresponding to the arrangement of said keys on said keyboard, whereby each of said key identifiers will be positioned over a corresponding key when said keyboard and key identification means are properly aligned with respect to one another, and with each of said key identifiers identifying the function of said corresponding key when said associated coding means is interconnected with said device,
   whereby the operator controllable functions performed by said device may be tailored to specific end uses of the device by interconnecting an appropriate coding means and associated key identification means therewith,
   wherein said array of keys comprises an array of keys which require little travel for actuation so that the pliance required of said sheet in order that said keys may each be actuated by depressing the corresponding portion of said sheet, is minimized, and
   wherein said portable hand-held data entry device further comprises display means for visually displaying information and wherein display identification means is provided removably interconnectable to said device for labeling portions said display in accordance with the one of said coding means then interconnected with said portable data entry device.

8. Apparatus comprising a portable hand-held data entry device including a keyboard having an array of keys thereon, said keys being actuable by manual depression for data entry or data manipulation, wherein the operations performed by said data entry device upon actuation of said keys is established by coded indications provided to said device by coding means interconnectable therewith, coding means removably interconnectable with said portable data entry device, said coding means providing coded indications thereto to select the functions to be performed by said portable data entry device upon actuation of said keys, and key indentification means associated with said coding means and comprising a sheet of material adapted to be removably laid over said array of keys, said sheet having sufficient pliance that said keys may each be actuated by depressing the corresponding portion of said sheet, and having an array of key identifiers carried thereon in an arrangement corresponding to the arrangement of said keys on said keyboard, whereby each of said key identifiers will be positioned over a corresponding key when said keyboard and key identification means are properly aligned with respect to one another, and with each of said key identifiers identifying the function of said corresponding key when said associated coding means is interconnected with said device, whereby the operator controllable functions performed by said device may be tailored to specific end uses of the device by interconnecting an appropriate coding means and associated key identification means therewith, wherein said array of keys comprises a first array of keys utilized to control functional operations performable by said data entry device, and wherein said keyboard also includes a second array of keys utilized for entry of data into said data entry device, the individual keys of said second array of keys having well defined contours and carrying key identifiers substantially permanently associated therewith, whereby said key identifiers for said second array of keys do not change when said key identification means and coding means associated with said device are changed.

9. Apparatus as set forth in claim 8, wherein said second array of keys comprises keys having a tactile feel, upon actuation, selected to provide the operator of said device with positive verification that said actuation has taken place.

10. Apparatus comprising
    a portable hand-held data entry device including a keyboard having an array of keys thereon, said keys being actuable by manual depression for data entry or data manipulation, wherein the operations performed by said data entry device upon actuation of said keys is established by coded indications provided to said device by coding means interconnectable therewith,
    coding means removably interconnectable with said portable data entry device, said coding means providing coded indications thereto to select the functions to be performed by said portable data entry device upon actuation of said keys, and key identification means associated with said coding means and comprising a sheet of material adapted to be removably laid over said array of keys, said sheet having sufficient pliance that said keys may each be actuated by depressing the corresponding portion of said sheet, and having an array of key identifiers carried thereon in an arrangement corresponding to the arrangement of said keys on said keyboard, whereby each of said key identifiers will be positioned over a corresponding key when said keyboard and key identification means are properly aligned with respect to one another, and with each of said key identifiers identifying the function of said corresponding key when said associated coding means is interconnected with said device, whereby the operator controllable functions performed by said device may be tailored to specific end uses of the device by interconnecting an appropriate coding means and associated key identification means therewith, wherein said array of keys comprises a first array of keys utilized to control functional operations performable by said data entry device, and wherein said keyboard also includes a second array of keys utilized for entry of data into said data entry device, said second array of keys carrying key identifiers substantially permanently associated therewith, whereby said key identifiers for said second array of keys do not change when said key identification means and coding means associated with said device are changed, and wherein both said first and second array of keys are formed of a common laminated structure including a substantially planar upper layer of pliant material having an array of first electrical contacts formed on the bottom surface thereof, a substantially planar lower layer of material having an array of second electrical contacts formed on the top surface thereof in registration with said first contacts, each associated first and second contact representing one of said keys, and a substantially planer middle layer of insulating material having an array of openings therein in registration with said first and second electrical contacts, whereby said keys may each be actuated by depressing the portion of said upper layer carrying one of said first contacts to cause it to deflect downward and meet the associated one of said second contacts.

11. Apparatus comprising a data entry device including a keyboard having an array of keys thereon, said keys being actuable by manual depression for data entry and data manipulation, wherein the functions performed by said data entry device upon actuation of said keys is established by coded indications provided to said device and key identification means removably connected to said device for providing said coded indications to said device and for labeling the function of the various said keys in accordance with the actual functions controlled by said keys as established by said coded indications, said key identification means comprising a sheet of material adapted to be laid over said array of keys, said sheet having sufficient pliance that said keys may be depressed by depressing the portion of said sheet overlaying said key, and having an array of key identifiers carried thereon in an arrangement corresponding to the arrangement of said keys on said keyboard such that each said key identifier will be positioned over a corresponding key when said keyboard and key identification means are properly aligned with respect to one another, wherein said key identification means further comprises a frame member for carrying said pliant sheet of material, said frame member being substantially rigid and adapted to hold said pliant sheet by the perimeter thereof so as to hold said sheet of material, and thus said key identifiers, in a predetermined alignment with respect to said frame member, and wherein said data entry device includes means for receiving and holding said frame member in a predetermined alignment with respect to said keyboard, said predetermined alignments between said keyboard and said frame member and said sheet material being selected so that said proper alignment between said keyboard and said key identification means will necessarily result when said frame member is received and held by said data entry device.

12. Apparatus as set forth in claim 11, wherein said frame member includes projections at selected places therealong, with the number and positions of said projections being selected in accordance with the particular key identifiers carried on said pliant sheet material, whereby the number and location of said projections represent said coded indications, and further wherein said data entry device includes means for sensing the number and position of said projections and for establishing the functions performed by said device upon actuation of the keys of said keyboard in accordance with the sensed said number and location of said projections.

13. Apparatus comprising a data entry device including a keyboard having an array of keys thereon, said keys being actuable by manual depression for data entry and data manipulation, wherein the functions performed by said data entry device upon actuation of said keys is established by coded indications provided to said device and key identification means removably connected to said device for providing said coded indications to said device and for labeling the function of the various said keys in accordance with the actual functions controlled by said keys as established by said coded indications, said key identification means comprising a sheet of material adapted to be laid over said array of keys, said sheet having sufficient pliance that said keys may be depressed by depressing the portion of said sheet overlaying said key, and having an array of key identifiers carried thereon in an arrangement corresponding to the arrangement of said keys on said keyboard such that each said key identifier will be positioned over a corresponding key when said keyboard and key identification means are properly aligned with respect to one another, wherein said data entry device further comprises display means for visually displaying information and wherein display identification means is provided removably interconnectable to said device for labeling portions of said display in accordance with the coded indications provided by the key identification means then interconnected with said data entry device.

* * * * *